(12) United States Patent
Ichikawa et al.

(10) Patent No.: US 10,029,444 B2
(45) Date of Patent: Jul. 24, 2018

(54) MULTILAYER NONWOVEN FABRIC FOR FOAM MOLDING

(71) Applicant: MITSUI CHEMICALS, INC., Minato-ku, Tokyo (JP)

(72) Inventors: Taro Ichikawa, Sodegaura (JP); Yoshinori Kobayashi, Yokkaichi (JP); Hidenori Yoshizawa, Tokyo (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 282 days.

(21) Appl. No.: 14/950,672

(22) Filed: Nov. 24, 2015

(65) Prior Publication Data
US 2016/0075103 A1    Mar. 17, 2016

Related U.S. Application Data

(62) Division of application No. 13/387,448, filed as application No. PCT/JP2011/051912 on Jan. 31, 2011.

(30) Foreign Application Priority Data

Jul. 13, 2010    (JP) ................... 2010-158865

(51) Int. Cl.
*B29C 44/12*     (2006.01)
*B32B 5/20*     (2006.01)
(Continued)

(52) U.S. Cl.
CPC .............. *B32B 5/26* (2013.01); *B29C 44/065* (2013.01); *B29C 44/1209* (2013.01); *B29C 44/145* (2013.01); *B29C 65/02* (2013.01); *B29C 66/45* (2013.01); *B29C 66/7294* (2013.01); *B32B 5/022* (2013.01); *B32B 5/06* (2013.01); *B32B 5/20* (2013.01); *B32B 5/245* (2013.01); *B32B 37/0076* (2013.01); *B32B 38/04* (2013.01); *B32B 38/08* (2013.01); *D04H 1/498* (2013.01); *D04H 1/559* (2013.01); *D04H 1/56* (2013.01); *D04H 3/105* (2013.01); *D04H 5/02* (2013.01); *D04H 5/06* (2013.01); *B29K 2623/12* (2013.01); *B29K 2713/00* (2013.01); *B29L 2031/58* (2013.01); *B32B 2038/0084* (2013.01); *B32B 2038/042* (2013.01); *B32B 2260/046* (2013.01); *B32B 2262/0253* (2013.01); *B32B 2266/0278* (2013.01); *B32B 2307/306* (2013.01); *B32B 2307/54* (2013.01); *B32B 2307/718* (2013.01); *B32B 2307/724* (2013.01); *B32B 2323/10* (2013.01); *B32B 2601/00* (2013.01); *Y10T 156/10* (2015.01); *Y10T 442/609* (2015.04); *Y10T 442/662* (2015.04)

(58) Field of Classification Search
CPC ....... B29C 44/06; B29C 44/065; B29C 44/12; B29C 44/1209; B29C 44/1214; B29C 44/145; B29C 65/70; B29C 66/723; B29C 66/727; B29C 66/7294; B29D 99/0092; B29K 2075/00; B29L 2031/58; B32B 5/022; B32B 5/06; B32B 5/20; B32B 5/245; B32B 5/26; B32B 37/0076; B32B 37/0084; B32B 2038/0084; B32B 2260/021; B32B 2260/023; B32B 2260/046; B32B 2262/0253; B32B 2266/0278; B32B 2305/022; B32B 2307/718; B32B 2307/72; B32B 2307/724; B32B 2323/10; B32B 2601/00; D04H 1/46; D04H 1/485; D04H 1/498; D04H 1/559; D04H 1/56; D04H 1/565; D04H 3/102; D04H 3/105; D04H 3/14; D04H 3/16; D04H 5/02; D04H 5/06; D04H 5/08

See application file for complete search history.

(56) References Cited

U.S. PATENT DOCUMENTS 6,158,815 A * 12/2000 Sugie ..................... A47C 7/282
                                                297/452.49
6,936,554 B1    8/2005 Singer et al.
(Continued)

FOREIGN PATENT DOCUMENTS

JP    58-38433 U       3/1983
JP    Y-S62-026193    7/1987
(Continued)

OTHER PUBLICATIONS

International Search Report (PCT/ISA/210) dated Apr. 26, 2011, by the Japanese Patent Office as the International Searching Authority for International Application No. PCT/JP2011/51912.
Supplementary European Search Report issued in corresponding European Application No. 11 80 6502 dated Jun. 6, 2012.
Machine translation for JP 2004-353153 A.
Office Action (Examination Report) dated Dec. 13, 2017, by the Intellectual Property Office of India in corresponding Indian Patent Application No. 772/DELNP/2012 and English Translation of the Office Action (6 pages).

*Primary Examiner* — Michael A Tolin
(74) *Attorney, Agent, or Firm* — Buchanan, Ingersoll & Rooney PC

(57) ABSTRACT

Multilayer nonwoven fabrics for foam molding that have excellent resistance to the separation of layers, have reinforcing effects and urethane leakage prevention performance, and are producible without the occurrence of fiber dust on the surface. In the multilayer nonwoven fabric for foam molding, a reinforcing layer is stacked on at least one side of a dense layer, the dense layer includes a meltblown nonwoven fabric layer (A) and spunbonded nonwoven fabric layers (B) that are stacked on both sides of the layer (A), and the meltblown nonwoven fabric layer (A) and the spunbonded nonwoven fabric layers (B) are partially thermocompression bonded with each other.

12 Claims, No Drawings

(51) Int. Cl.
*B32B 5/24* (2006.01)
*D04H 5/02* (2012.01)
*D04H 5/06* (2006.01)
*B32B 5/26* (2006.01)
*B29C 44/14* (2006.01)
*D04H 3/105* (2012.01)
*B29C 44/06* (2006.01)
*D04H 1/498* (2012.01)
*D04H 1/559* (2012.01)
*D04H 1/56* (2006.01)
*B32B 5/02* (2006.01)
*B32B 5/06* (2006.01)
*B29C 65/02* (2006.01)
*B29C 65/00* (2006.01)
*B32B 37/00* (2006.01)
*B32B 38/04* (2006.01)
*B32B 38/08* (2006.01)
*B29L 31/58* (2006.01)
*B32B 38/00* (2006.01)

(56) References Cited

U.S. PATENT DOCUMENTS

| | | | |
|---|---|---|---|
| 7,678,093 | B2 | 3/2010 | Nordness et al. |
| 7,685,649 | B2 | 3/2010 | Jordan et al. |
| 2004/0092902 | A1 | 5/2004 | Hoffman et al. |
| 2009/0247037 | A1* | 10/2009 | Kanda .................. D04H 1/498 442/402 |
| 2009/0308524 | A1 | 12/2009 | Gunji et al. |

FOREIGN PATENT DOCUMENTS

| | | |
|---|---|---|
| JP | 2-258332 A | 10/1990 |
| JP | 2000-313081 A | 11/2000 |
| JP | 2004-003096 A | 1/2004 |
| JP | 2004-353153 A | 12/2004 |
| JP | 4472753 B2 | 6/2010 |
| JP | 2011-052332 A | 3/2011 |
| WO | WO 2005/010262 A1 | 7/2004 |
| WO | 2010/017158 A1 | 2/2010 |

* cited by examiner

MULTILAYER NONWOVEN FABRIC FOR FOAM MOLDING

TECHNICAL FIELD

The present invention relates to multilayer nonwoven fabrics for use in foam molding that have excellent resistance to the separation of layers and provide reinforcing effects as well as urethane leak prevention performance. In particular, the invention relates to multilayer nonwoven fabrics for foam molding that are to be provided at the bottom of foamed articles such as polyurethane foams.

BACKGROUND ART

Foamed articles such as flexible polyurethane foams are used as cushioning materials for products such as vehicle seats. At the bottom of such a foamed article, a reinforcing base fabric is provided in order to increase the rigidity of the urethane foam as well as to prevent the leakage of urethane to the backside. For example, this reinforcing base fabric is a combination of a Victoria lawn (cheesecloth) and urethane slab, or a worsted fabric. However, such base fabrics do not provide sufficient improvements in the rigidity of the urethane foams, or do not sufficiently prevent the leakage of urethane to the backside.

Various methods have been proposed to remedy these defects. For example, JP-Y-S62-26193 (Patent Document 1) discloses a nonwoven fabric as a reinforcing base fabric which is a combination of a thinner dense layer having a basis weight of 10 to 30 $g/m^2$ and a bulky thick layer having a basis weight of 40 to 100 $g/m^2$. JP-A-H02-258332 (Patent Document 2) discloses a high basis weight nonwoven fabric having a basis weight of 110 to 800 $g/m^2$ and a fiber diameter of 1 to 16 d. JP-A-2004-353153 (Patent Document 3) discloses a reinforcing material which includes a dense layer that is a meltblown nonwoven fabric having a fiber diameter of not more than 10 μm.

With the foam-reinforcing base fabric disclosed in Patent Document 1, however, there is a risk that urethane leakage cannot be prevented effectively because the basis weight of the dense layer is low. Although the foam-reinforcing base fabric of Patent Document 2 can prevent urethane leakage, the basis weight of the base fabric is so large that the base fabric is impregnated with an excessively large amount of urethane, resulting in deteriorations in cushioning properties and strength due to lowering in urethane density, as well as in economic efficiency due to the large weight of the material.

Patent Document 3 describes that the dense layer may be a meltblown nonwoven fabric having a basis weight of 40 $g/m^2$ or less, more preferably 15 to 20 $g/m^2$, and a fiber diameter of not more than 10 μm. However, when the meltblown nonwoven fabric layer having such a small fiber diameter is needle punched to a spunbonded nonwoven fabric layer, the fibers of these layers are not entangled adequately probably because of a great difference in fiber diameter between the fibers forming the meltblown nonwoven fabric layer and the fibers forming the spunbonded nonwoven fabric layer. Thus, there is a risk that the layers are separated. Further, the needles can cut the fibers of the meltblown nonwoven fabric layer to cause the occurrence of fiber dust on the surface of the obtainable foam-reinforcing nonwoven fabric.

Patent Documents

Patent Document 1: JP-Y-S62-26193
Patent Document 2: JP-A-H02-258332
Patent Document 3: JP-A-2004-353153

DISCLOSURE OF THE INVENTION

Problems to be Solved by the Invention

It is an object of the invention to obtain multilayer nonwoven fabrics for foam molding that have excellent resistance to the separation of layers, have reinforcing effects and urethane leakage prevention performance, and are producible without the occurrence of fiber dust on the surface due to fibers of a meltblown nonwoven fabric layer being cut even when the layers are stacked (entangled) by needle punching.

Means to Solve the Problems

An aspect of the present invention provides a multilayer nonwoven fabric for foam molding in which a reinforcing layer is stacked on at least one side (or one surface) (hereinafter, referred to as "one side") of a dense layer, wherein
the dense layer comprises a meltblown nonwoven fabric layer (A) and spunbonded nonwoven fabric layers (B) that are stacked on both sides (or both surfaces) (hereinafter, referred to as "both sides") of the meltblown nonwoven fabric layer (A), and the meltblown nonwoven fabric layer (A) and the spunbonded nonwoven fabric layers (B) are partially thermocompression bonded with each other.

Another aspect of the invention provides a multilayer nonwoven fabric for foam molding in which a foamed urethane is stacked on the reinforcing layer side of the above multilayer nonwoven fabric.

A further aspect of the invention provides a vehicle seat and a chair that have a multilayer nonwoven fabric for foam molding in which a foamed urethane is stacked on the reinforcing layer side of the above multilayer nonwoven fabric.

Effect of the Invention

In the multilayer nonwoven fabrics for foam molding according to the invention, the dense layer includes a meltblown nonwoven fabric layer and spunbonded nonwoven fabric layers that are partially thermocompression bonded with each other. When the multilayer nonwoven fabric is provided inside a mold and urethane or the like is expanded in the mold, this configuration blocks the penetration of the foaming resin liquid in the middle of the multilayer nonwoven fabric. Thus, in the case where an automobile seat is produced using the multilayer nonwoven fabric, unusual noises by friction between the urethane foam and metal parts can be effectively prevented.

Because the dense layer is constituted by the meltblown nonwoven fabric layer and the spunbonded nonwoven fabric layers that are partially thermocompression bonded with each other, this multilayer structure can be bonded with the reinforcing layer by, for example, needle punching so as to achieve strong entanglements with the fibers of the reinforcing layer. Thus, there is no risk that the layers are separated even when the reinforcing layer is impregnated with a foaming resin liquid or during the use of the foamed article.

Further, the inventive multilayer nonwoven fabric allows for the production of a dense foam layer and effectively adds rigidity to the foamed layer. Furthermore, the configuration according to the invention prevents the surface of the multilayer nonwoven fabric from the contamination with the fiber dust originating from the meltblown nonwoven fabric layer.

BEST MODE FOR CARRYING OUT THE INVENTION

⟨Thermoplastic Resins⟩

The nonwoven fabrics forming the dense layer and the reinforcing layer in the invention may be made of any thermoplastic resins without limitation as long as the thermoplastic resins can provide nonwoven fabrics. Various known thermoplastic resins may be used in the invention. Examples include homopolymers and copolymers of α-olefins such as ethylene, propylene, 1-butene, 1-hexene, 4-methyl-1-pentene and 1-octene, with specific examples including high-pressure low-density polyethylenes, linear low-density polyethylenes (LLDPE), high-density polyethylenes (HDPE), polypropylenes (propylene homopolymers), polypropylene random copolymers, poly(1-butene), poly(4-methyl-1-pentene), ethylene/propylene random copolymers, ethylene/1-butene random copolymers and propylene/1-butene random copolymers, polyesters (polyethylene terephthalate, polybutylene terephthalate and polyethylene naphthalate), polyamides (nylon-6, nylon-66 and polymethaxyleneadipamide), polyvinyl chloride, polyimides, ethylene/vinyl acetate copolymers, ethylene/vinyl acetate/vinyl alcohol copolymers, ethylene/(meth)acrylic acid copolymers, ethylene/acrylate/carbon monoxide copolymers, polyacrylonitriles, polycarbonates, polystyrenes, ionomers and mixtures of these resins. Of these, ethylene polymers such as high-pressure low-density polyethylenes, linear low-density polyethylenes (LLDPE) and high-density polyethylenes, propylene polymers such as polypropylenes and polypropylene random copolymers, polyethylene terephthalates and polyamides are more preferable.

The thermoplastic resins used in the invention may contain various known additives while still achieving the object of the invention. Exemplary additives include antioxidants, weather stabilizers, light stabilizers, antiblocking agents, lubricants, nucleating agents, pigments, softeners, hydrophilic agents, auxiliaries, water repellants, fillers and antibacterial agents.

Of the thermoplastic resins, polyolefins, in particular propylene polymers, are preferable from the viewpoints of spinning stability during the nonwoven fabric production as well as processability, air permeability, flexibility, lightweight and heat resistance of the nonwoven fabrics.

⟨Propylene Polymers⟩

Preferred propylene polymers for use in the invention are propylene homopolymers or copolymers of propylene and a very small amount of one, or two or more α-olefins having 2 or more carbon atoms (except the $C_3$ olefin), and preferably 2 to 8 carbon atoms (except the $C_3$ olefin), such as ethylene, 1-butene, 1-pentene, 1-hexene, 1-octene and 4-methyl-1-pentene. Such propylene polymers in the invention usually have a melting point (Tm) of not less than 125° C., and preferably 130 to 165° C.

The melt flow rate (MFR: ASTM D-1238, 230° C., 2160 g load) of the propylene polymer is not particularly limited as long as the polymer can be melt spun. When the polymer is used to produce the meltblown nonwoven fabric which constitutes the dense layer, the melt flow rate thereof is usually in the range of 10 to 3000 g/10 min, preferably 50 to 2000 g/10 min, and more preferably 100 to 1000 g/10 min. When the polymer is used to produce the spunbonded nonwoven fabrics which constitute the dense layer as well as to produce the reinforcing layer, the melt flow rate thereof is usually in the range of 1 to 500 g/10 min, preferably 5 to 200 g/10 min, and more preferably 10 to 100 g/10 min.

⟨Meltblown Nonwoven Fabric Layer (A)⟩

The meltblown nonwoven fabric layer (A) which constitutes the dense layer in the invention is a nonwoven fabric layer made of the above thermoplastic resin, and usually has a fiber diameter in the range of 0.1 to 5 μm, preferably 0.5 to 3 μm, and a basis weight in the range of 0.1 to 5 g/m$^2$, preferably 1 to 3 g/m$^2$.

The above fiber diameter and basis weight of the meltblown nonwoven fabric layer (A) ensure that the multilayer nonwoven fabric used as a seat-reinforcing base fabric prevents the leakage of a urethane liquid or a urethane foam (hereinafter, sometimes collectively referred to as "urethane"), as well as that the dense layer can be needle punched to the base layer with a reduced probability for the fibers of the meltblown nonwoven fabric layer (A) to be cut by the needles. Further, the above fiber diameter and basis weight enable weight reduction of the multilayer nonwoven fabric for foam molding.

With regard to the prevention of urethane leakage, any basis weight of the meltblown nonwoven fabric layer that is in excess of the above range does not add extra effects because the improvements have been saturated at the upper limit of the aforementioned range. On the other hand, any basis weight in excess of the above range can increase the probability that many of the fibers forming the meltblown nonwoven fabric layer will be cut during needle punching when the dense layer is bonded to the base layer, resulting in the occurrence of fiber dust. Further, because the contributions of the meltblown nonwoven fabric layer to the improvements in the strength of the multilayer nonwoven fabric and the strength of the entanglements produced by needle punching are relatively small, the above ranges of the fiber diameter and the basis weight are preferable from the viewpoint of weight reduction of the multilayer nonwoven fabric for foam molding.

⟨Spunbonded Nonwoven Fabric Layer (B)⟩

The spunbonded nonwoven fabric layers (B) which constitute the dense layer in the invention are nonwoven fabric layers made of the aforementioned thermoplastic resin, and usually have a fiber diameter in the range of 10 to 40 μm, preferably 10 to 20 μm, and a basis weight in the range of 10 to 50 g/m$^2$, preferably 10 to 20 g/m$^2$.

The above fiber diameter and basis weight of the spunbonded nonwoven fabric layers (B) ensure that the dense layer and the base layer can be bonded by needle punching so as to strongly entangle the fibers of the dense layer with the fibers of the base layer, as well as that the obtainable multilayer nonwoven fabric for foam molding prevents urethane leakage and achieves a reduction in weight.

⟨Dense Layer⟩

The dense layer that constitutes the multilayer nonwoven fabric for foam molding according to the invention is a multilayer structure in which the spunbonded nonwoven fabric layers (B) are stacked onto both sides of the meltblown nonwoven fabric layer (A), and the meltblown nonwoven fabric layer (A) and the spunbonded nonwoven fabric layers (B) are partially thermocompression bonded with each other. A variety of thermocompression bonding methods may be used as will be described later. Embossing is preferably used. In the invention, the term "partially" means an area ratio of 5 to 30%, and preferably 5 to 20%.

The dense layer according to the invention preferably has a bulk density of 0.05 to 0.5 g/cm$^3$, and preferably 0.05 to 0.3 g/cm$^3$. This bulk density ensures that the fibers maintain denseness even after the fibers are entangled, thereby preventing urethane leakage effectively.

The basis weight of the dense layer (the total of the basis weights of the meltblown nonwoven fabric layer (A) and the spunbonded nonwoven fabric layers (B) that have been stacked together) is usually in the range of 10 to 60 g/m$^2$, preferably 10 to 35 g/m$^2$, and more preferably 10 to 25 g/m$^2$.

The dense layer of the invention may be produced by a combination of a known meltblowing method and a known spunbonding method.

An exemplary production method will be described. The aforementioned thermoplastic resin is spun from spinneret nozzles, and the continuous fiber filaments that have been spun are quenched with a cooling fluid and are attenuated to a desired denier by applying a tension to the filaments by stretching air. The filaments are then collected on a collection belt that is moving to give a spunbonded nonwoven fabric layer (B). Thereafter, the thermoplastic resin in the molten state is extruded and spun from a meltblowing spinneret and the filaments are attenuated to ultrafine fibers by a high-temperature and high-speed air. The stream of the ultrafine fibers is collected by a collection device and a web of the ultrafine fibers is formed as a meltblown nonwoven fabric layer (A) on the spunbonded nonwoven fabric layer (B). Subsequently, another spunbonded nonwoven fabric layer (B) is stacked onto the meltblown nonwoven fabric layer (A), followed by partial thermocompression bonding.

The meltblown nonwoven fabric layer (A) and the spunbonded nonwoven fabric layers (B) may be partially thermocompression bonded with each other by any known method without limitation. In particular, embossing is a preferred thermocompression bonding method of the dense layer because it can easily control the bulk density of the dense layer so as to be within the aforementioned range and further because it can increase the rigidity of the dense layer such that the dense layer does not sag and can be attached to a mold easily to achieve an improvement in working speed. Further, embossing is preferable also in view of the prevention of the passage of a urethane liquid.

When the thermocompression bonding is performed by hot embossing, the embossing area ratio is usually in the range of 5 to 30%, and preferably 5 to 20%. Exemplary embossing shapes include circle shapes, elliptical shapes, oval shapes, square shapes, rhombic shapes, rectangular shapes, quadrangular shapes, quilt shapes, grid shapes, tortoise shell shapes, and continuous shapes based on these shapes.

According to the dense layer of the invention, the spunbonded nonwoven fabric layers (B) that have a larger fiber diameter than the fiber diameter of the meltblown nonwoven fabric layer (A) are stacked on both sides of the meltblown nonwoven fabric layer (A). The spunbonded nonwoven fabric layers (B) thus function more effectively as reinforcing materials for the meltblown nonwoven fabric layer (A).

⟨Multilayer Nonwoven Fabrics for Foam Molding⟩

In the multilayer nonwoven fabric for foam molding according to the present invention, a reinforcing layer is stacked on at least one side, preferably both sides, of the dense layer.

When the reinforcing layer is stacked on one side of the dense layer, urethane will be stacked on the reinforcing layer side of the multilayer nonwoven fabric for foam molding. That is, the multilayer structure will be urethane foam/reinforcing layer/dense layer.

A single, or two or more reinforcing layers may be stacked on the dense layer.

The multilayer nonwoven fabric for foam molding may be produced by stacking the dense layer and the reinforcing layer by any of known methods including thermal fusion bonding methods such as hot embossing and ultrasonic fusion bonding, mechanical entanglement methods such as needle punching and water jetting, adhesive bonding methods with hot melt adhesives or urethane adhesives, and extrusion laminating methods. A preferred method is a mechanical entanglement method by needle punching, or a thermal fusion bonding method. In particular, needle punching is preferable in that the obtainable multilayer nonwoven fabric for foam molding has appropriate air permeability so as to pass a gas generated by urethane expansion while controlling the penetration of the urethane liquid.

When the layers are stacked (entangled) with each other by needle punching, an oil agent such as a softener or a slip agent may be kneaded into or applied to the nonwoven fabrics for the purposes of reducing the probability for the fibers to be cut during needle punching as well as reducing unusual noise by friction between the foamed article and metal parts, while still achieving the advantageous effects of the invention.

In the conventional case where a reinforcing layer is stacked directly on a meltblown nonwoven fabric layer by, for example, needle punching, the fine fibers of the meltblown nonwoven fabric layer are cut and thus are not adequately entangled with the fibers of the reinforcing layer, resulting in a multilayer nonwoven fabric having low bonding strength. In contrast, the multilayer nonwoven fabric for foam molding according to the invention has the dense layer that is configured such that the spunbonded nonwoven fabric layers (B) are stacked and thermocompression bonded on both sides of the meltblown nonwoven fabric layer (A). With this configuration, even when the dense layer and the reinforcing layer are bonded together by needle punching, the fibers of the spunbonded nonwoven fabric layer (B) and the fibers of the reinforcing layer are adequately entangled together without fiber breakage, thereby achieving high bonding strength between the dense layer and the reinforcing layer. Even if the fibers of the meltblown nonwoven fabric layer (A) are cut by the needles, the above configuration eliminates the risk that the fiber dust will come on the surface of the multilayer nonwoven fabric for foam molding.

The inventive multilayer nonwoven fabric for foam molding preferably has an air permeability of 25 to 160 cm$^3$/cm$^2$/sec, and preferably 25 to 110 cm$^3$/cm$^2$/sec. This air permeability ensures good prevention of urethane leakage. Further, this air permeability enables forming of a dense foam layer and is therefore effective in improving the rigidity of the foam.

The inventive multilayer nonwoven fabric for foam molding preferably has a basis weight of 20 to 160 g/m$^2$, more preferably 25 to 120 g/m$^2$, and still more preferably 30 to 100 g/m$^2$.

The reinforcing layer that constitutes the inventive multilayer nonwoven fabric for foam molding is not particularly limited and may be any of known nonwoven fabrics including continuous long fiber nonwoven fabrics such as spunbonded nonwoven fabrics and meltblown nonwoven fabrics and staple short fiber nonwoven fabrics such as wet nonwoven fabrics, carded nonwoven fabrics, dry pulp nonwoven fabrics, flash-spun nonwoven fabrics and spread-fiber nonwoven fabrics.

Of these nonwoven fabrics, the reinforcing layer is preferably a spunbonded nonwoven fabric layer (C) in view of the strength of the obtainable multilayer nonwoven fabric for foam molding.

The spunbonded nonwoven fabric layer (C) in the invention is a nonwoven fabric layer that is made of the aforementioned thermoplastic resin. The fiber diameter thereof is usually in the range of 12 to 50 µm, preferably 15 to 40 µm, and the basis weight is usually 10 to 50 g/m², preferably 15 to 35 g/m².

In a preferred embodiment, the spunbonded nonwoven fabric layer (C) has a larger fiber diameter than that of the fibers forming the spunbonded nonwoven fabric layer (B) of the dense layer. The spunbonded nonwoven fabric layer (C) which has such a large fiber diameter shows excellent entanglement properties with a reduced probability of fiber breakage when the layers are bonded by needle punching, and the resultant multilayer nonwoven fabric for foam molding achieves excellent entanglement strength and tensile strength between the dense layer and the reinforcing layer while ensuring quick impregnation of urethane.

The fibers for forming the spunbonded nonwoven fabric layer (C) may be single fibers, side-by-side or sheath-core conjugated fibers, or crimped fibers. The fibers may have a circular cross section or a modified cross section such as a V-shaped, X-shaped or T-shaped cross section. Further, the fibers may be concentric fibers having a core and a sheath.

The spunbonded nonwoven fabric layer (C) may be a nonwoven fabric composed of a single kind of fibers, mixed fibers that are a mixture of two or more kinds of thermoplastic resin fibers, or mixed fibers that are a mixture of two or more kinds of fibers having different shapes.

An additional layer may be stacked to the inventive multilayer nonwoven fabric for foam molding while still achieving the advantageous effects of the invention.

Examples of the additional layers that may be stacked to the inventive nonwoven fabric include knitted fabrics, woven fabrics, nonwoven fabrics, films and paper products. These additional layers may be stacked (bonded) to the inventive nonwoven fabric by any of known methods including thermal fusion bonding methods such as hot embossing and ultrasonic fusion bonding, mechanical entanglement methods such as needle punching and water jetting, adhesive bonding methods with hot melt adhesives or urethane adhesives, and extrusion lamination methods.

The inventive multilayer nonwoven fabric for foam molding may be subjected to secondary processing such as gear processing, printing, coating, lamination, heat treatment or shaping processing while still achieving the objects of the invention.

EXAMPLES

The present invention will be described in detail based on examples hereinbelow without limiting the scope of the invention.

Properties in Examples and Comparative Examples were measured by the following methods.

(1) Basis Weight (g/m²)

Ten samples 100 mm in machine direction (MD) and 100 mm in cross direction (CD) were obtained from a nonwoven fabric, and the average of the basis weights thereof was determined.

(2) Thickness (mm)

The thickness was measured at five sites, namely, the center and the four corners of the basis weight measurement samples. The average thickness of the 50 sites was obtained. The thickness meter applied a load of 2 g/cm² (load area: 4 cm²).

(3) Bulk Density (g/Cm³)

The bulk density of the nonwoven fabric was determined from the following equation using the basis weight and the thickness obtained in (1) and (2).

$$\text{Bulk density} = \text{basis weight (g/m}^2\text{)/(thickness (mm)/} 10 \times 100 \times 100)$$

(4) Strength (N/50 mm)

The strength was determined in accordance with JIS L1906. Test pieces 200 mm (MD)×50 mm (CD) were obtained from a multilayer nonwoven fabric for foam molding. The test piece was tested with a tensile tester (AUTOGRAPH AGS-J manufactured by Shimadzu Corporation) by being clamped between chucks 100 mm apart from each other and pulled at a head speed of 100 mm/min. The test was performed 5 times with respect to MD and 5 times with respect to CD. The average value was obtained as the strength.

(5) Air Permeability (cm³/cm²/sec)

A test piece 200 mm (MD)×50 mm (CD) was obtained from the multilayer nonwoven fabric for foam molding, and was tested with a Frazier air permeability tester in accordance with JIS L1096.

(6) Urethane Leakage Evaluation

The multilayer nonwoven fabric for foam molding (400 mm (MD)×400 mm (CD)) was attached to a foaming mold, and urethane leakage was visually evaluated based on the following criteria.

No leakage: A

Substantially no leakage: B

Slight leakage: C

Heavy leakage: D

The resin material that was foamed was polyurethane. The foaming mold was an automobile seat mold.

(7) Occurrence of Fiber Dust During Needle Punching

The surface of the needle punched multilayer nonwoven fabric for foam molding was observed to inspect for fiber dust of a visually recognizable size ranging from about 0.5 to 3 mm. The evaluation was made based on the following criteria.

No fiber dust: A

Substantially no fiber dust: B

Slight amount of fiber dust: C

Large amount of fiber dust: D (8) Fiber Entanglement Between Base Layer and Dense Layer A cross section of the needle punched multilayer nonwoven fabric for foam molding was pictured using a scanning electron microscope (S-3500N manufactured by Hitachi, Ltd.) at ×35 magnification. The entanglements between the fibers of the dense layer and the fibers of the base layer were evaluated with respect to the micrograph. The evaluation was made based on the following criteria.

No entanglements: D

Substantially no entanglements: C

Some entanglements: B

Large number of entanglements: A

Example 1

⟨Production of Dense Layer⟩

A propylene homopolymer having MFR of 60 g/10 min was melt spun at 230° C., and the fibers were deposited on a collecting surface to give a spunbonded nonwoven fabric layer (B-1) (fiber diameter: 15 μm) having a basis weight of 5.9 g/m².

Next, a propylene homopolymer having MFR of 400 g/10 min was molten in an extruder at 280° C., and the molten polymer was extruded from a spinneret while blowing hot air at 280° C. to the fibers at the exit of the orifices. This meltblowing resulted in fibers having a fiber diameter of 3 μm that were deposited on the spunbonded nonwoven fabric (B-1). Thus, a meltblown nonwoven fabric layer (A-1) having a basis weight of 1.2 g/m² was formed. Further, a spunbonded nonwoven fabric (B-2) that was similar to the spunbonded nonwoven fabric (B-1) was deposited on the meltblown nonwoven fabric layer. The three layers were bonded with each other using a hot emboss roll having an embossing area ratio of 18%. Thus, a dense layer composed of the SMS nonwoven fabrics was obtained. The total basis weight of the dense layer was 13 g/m².

⟨Production of Reinforcing Layer⟩

A propylene homopolymer having MFR of 60 g/10 min was melt spun at 230° C., and the fibers were deposited on a collecting surface to give a spunbonded nonwoven fabric (C-1) (fiber diameter: 21 μm) having a basis weight of 35 g/m².

⟨Production of Multilayer Nonwoven Fabric for Foam Molding⟩

The spunbonded nonwoven fabric layers (C-2) were stacked onto both sides of the dense layer, and the layers were bonded together by needle punching to give a multilayer nonwoven fabric for foam molding. The properties of the multilayer nonwoven fabric were measured by the aforementioned methods, the results being described in Table 1.

Examples 2 to 5

Multilayer nonwoven fabrics for foam molding were obtained in the same manner as in Example 1, except that the basis weights of the meltblown nonwoven fabric layer and the spunbonded nonwoven fabric layers in the dense layer were changed as described in Table 1. The properties of the multilayer nonwoven fabrics were measured by the aforementioned methods, the results being described in Table 1.

Example 6

Two identical dense layers were produced in the same manner as in Example 2. These dense layers were stacked one on top of the other. Spunbonded nonwoven fabric layers were stacked onto both sides of the combined dense layers, and the layers were bonded together in the same manner as in Example 1 to give a multilayer nonwoven fabric for foam molding. The properties of the multilayer nonwoven fabric were measured by the aforementioned methods, the results being described in Table 1.

Example 7

Three identical dense layers were produced in the same manner as in Example 3. These dense layers were stacked on top of one another. Spunbonded nonwoven fabric layers were stacked onto both sides of the combined dense layers, and the layers were bonded together in the same manner as in Example 1 to give a multilayer nonwoven fabric for foam molding. The properties of the multilayer nonwoven fabric were measured by the aforementioned methods, the results being described in Table 1.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Base layer | Spunbonded nonwoven fabric | | S | S | S | S | S | S | S |
| | Basis weight | g/m² | 35 | 35 | 35 | 35 | 35 | 35 | 35 |
| | Fiber diameter | μm | 21 | 21 | 21 | 21 | 21 | 21 | 21 |
| | Number of stacked layers | layers | 2 | 2 | 2 | 2 | 2 | 2 | 2 |
| Dense layer | Configuration S = spunbonded M = meltblown | | SMS | SMS | SMS | SMS | SMS | SMS | SMS |
| | Number of stacked layers | layers | 1 | 1 | 1 | 1 | 1 | 2 | 3 |
| | Basis weight (per one layer) | g/m² | 13 | 15 | 15 | 15 | 17 | 15 | 15 |
| | Thickness (per one layer) | mm | 0.19 | 0.18 | 0.24 | 0.25 | 0.25 | 0.18 | 0.24 |
| | Bulk density (per one layer) | g/cm³ | 0.07 | 0.08 | 0.06 | 0.06 | 0.07 | 0.08 | 0.06 |
| | Basis weight of M layer | g/m² | 1.2 | 1.0 | 1.9 | 1.2 | 1.5 | 1.0 | 1.9 |
| | Basis weight of S layer | g/m² | 11.8 | 14 | 13.1 | 13.8 | 15.5 | 14 | 13.1 |
| | Fiber diameter of M layer | μm | 3 | 3 | 3 | 3 | 3 | 3 | 3 |
| | Fiber diameter of S layer | μm | 15 | 15 | 15 | 15 | 15 | 15 | 15 |
| Multilayer nonwoven fabric for foam molding | Basis weight | g/m² | 87 | 90 | 87 | 87 | 87 | 100 | 116 |
| | Thickness | mm | 1.4 | 1.5 | 1.5 | 1.3 | 1.4 | 1.6 | 1.8 |
| | Tensile strength MD | N/50 mm | 108 | 114 | 154 | 142 | 138 | 76 | 53 |
| | CD | N/50 mm | 134 | 136 | 130 | 107 | 112 | 112 | 96 |
| | Elongation MD | % | 140 | 174 | 110 | 98 | 106 | 147 | 155 |
| | CD | % | 125 | 133 | 136 | 113 | 123 | 146 | 127 |
| | Air permeability | cm³/cm²/s | 99 | 89 | 86 | 90 | 78 | 50 | 29 |
| | Urethane leakage | | B | A | A | B | A | A | A |
| | Occurrence of fiber dust by needle punching | | B | B | B | B | B | B | B |
| | Fiber entanglement between base layer and dense layer | | B | B | B | B | B | B | B |
| | Total evaluation | | Good | Good | Good | Good | Good | Good | Good |

Example 8

Two identical dense layers were produced in the same manner as in Example 3. These dense layers were stacked one on top of the other. Spunbonded nonwoven fabric layers were stacked onto both sides of the combined dense layers, and the layers were bonded together in the same manner as in Example 1, except that the basis weight and the fiber diameter of the spunbonded nonwoven fabric layers were 50 g/m² and 35 μm, thereby producing a multilayer nonwoven fabric for foam molding. The properties of the multilayer nonwoven fabric were measured by the aforementioned methods, the results being described in Table 2.

Example 9

Three identical dense layers were produced in the same manner as in Example 3. These dense layers were stacked on top of one another. Spunbonded nonwoven fabric layers were stacked onto both sides of the combined dense layers, and the layers were bonded together in the same manner as in Example 1, except that the basis weight and the fiber diameter of the spunbonded nonwoven fabric layers were 50 g/m² and 35 μm, thereby producing a multilayer nonwoven fabric for foam molding. The properties of the multilayer nonwoven fabric were measured by the aforementioned methods, the results being described in Table 2.

Example 10

A multilayer nonwoven fabric for foam molding was obtained in the same manner as in Example 1, except that the basis weights of the meltblown nonwoven fabric layer and the spunbonded nonwoven fabric layers in the dense layer were changed as described in Table 1, and that the basis weight and the fiber diameter of the spunbonded nonwoven fabric layers that were stacked onto both sides of the dense layer were 25 g/m² and 20 μm. The properties of the multilayer nonwoven fabric were measured by the aforementioned methods, the results being described in Table 2.

Example 11

A multilayer nonwoven fabric for foam molding was obtained in the same manner as in Example 1, except that the dense layer was prepared in the same manner as in Example 3, and that the basis weight and the fiber diameter of the spunbonded nonwoven fabric layers that were stacked onto both sides of the dense layer were 25 g/m² and 20 μm. The properties of the multilayer nonwoven fabric were measured by the aforementioned methods, the results being described in Table 2.

Comparative Example 1

A multilayer nonwoven fabric for foam molding was obtained in the same manner as in Example 1, except that the dense layer was a single meltblown nonwoven fabric layer having a basis weight of 7 g/m². Needle punching generated a large amount of fiber dust which heavily contaminated the surface of the multilayer nonwoven fabric. Microscopic observation confirmed that substantially no entanglements had been formed between the meltblown fibers of the dense layer and the spunbonded fibers of the base layer. The results are described in Table 2.

Comparative Example 2

A multilayer nonwoven fabric for foam molding was obtained in the same manner as in Comparative Example 1, except that the basis weight and the fiber diameter of the spunbonded nonwoven fabric layers that were stacked onto both sides of the dense layer were 50 g/m² and 35 μm. Similarly to Comparative Example 1, needle punching generated a large amount of fiber dust which heavily contaminated the surface of the multilayer nonwoven fabric. Microscopic observation confirmed that substantially no entanglements had been formed between the meltblown fibers of the dense layer and the spunbonded fibers of the base layer. The results are described in Table 2.

TABLE 2

|  |  |  | Ex. 8 | Ex. 9 | Ex. 10 | Ex. 11 | Comp. Ex. 1 | Comp. Ex. 2 |
|---|---|---|---|---|---|---|---|---|
| Base layer | Spunbonded nonwoven fabric |  | S | S | S | S | S | S |
|  | Basis weight | g/m² | 50 | 50 | 25 | 25 | 35 | 50 |
|  | Fiber diameter | μm | 35 | 35 | 20 | 20 | 21 | 35 |
|  | Number of stacked layers | layers | 2 | 2 | 2 | 2 | 2 | 2 |
| Dense layer | Configuration S = spunbonded M = meltblown |  | SMS | SMS | SMS | SMS | M | M |
|  | Number of stacked layers | layers | 2 | 3 | 1 | 1 | 1 | 1 |
|  | Basis weight (per one layer) | g/m² | 15 | 15 | 50 | 15 | 7 | 7 |
|  | Thickness (per one layer) | mm | 0.24 | 0.24 | 0.41 | 0.24 | 0.1 | 0.1 |
|  | Bulk density (per one layer) | g/cm³ | 0.06 | 0.06 | 0.12 | 0.06 | 0.07 | 0.07 |
|  | Basis weight of M layer | g/m² | 1.9 | 1.9 | 1.5 | 1.9 | 7.0 | 7.0 |
|  | Basis weight of S layer | g/m² | 13.1 | 13.1 | 48.5 | 13.1 | 0 | 0 |
|  | Fiber diameter of M layer | μm | 3 | 3 | 3 | 3 | 3 | 3 |
|  | Fiber diameter of S layer | μm | 15 | 15 | 15 | 15 | — | — |
| Multilayer nonwoven fabric for foam molding | Basis weight | g/m² | 127 | 145 | 100 | 63 | 91 | 112 |
|  | Thickness | mm | 2.0 | 2.3 | 1.4 | 1.0 | 1.4 | 2.0 |
|  | Tensile strength MD | N/50 mm | 165 | 171 | 160 | 90 | 230 | 182 |
|  | CD | N/50 mm | 76 | 92 | 85 | 60 | 132 | 81 |
|  | Elongation MD | % | 163 | 99 | 106 | 62 | 110 | 205 |
|  | CD | % | 170 | 125 | 125 | 90 | 176 | 250 |

TABLE 2-continued

|  | Ex. 8 | Ex. 9 | Ex. 10 | Ex. 11 | Comp. Ex. 1 | Comp. Ex. 2 |
| --- | --- | --- | --- | --- | --- | --- |
| Air permeability cm³/cm²/s | 61 | 45 | 52 | 98 | 52 | 103 |
| Urethane leakage | A | A | A | B | A | B |
| Occurrence of fiber dust by needle punching | B | B | B | B | D | D |
| Fiber entanglement between base layer and dense layer | B | B | B | B | D | D |
| Total evaluation | Good | Good | Good | Good | Bad | Bad |

INDUSTRIAL APPLICABILITY

The reinforcing materials for foam molding according to the present invention are applicable to any types of foamed articles. For example, the use of the reinforcing material in the production of foamed articles of urethane or the like can add high rigidity and prevent unusual noises. For example, the inventive reinforcing materials may be used in the molding of foamed articles for various applications such as vehicle seats including automobile seats, furniture, chairs and beds.

The invention claimed is:

1. A process for producing a reinforced foam article comprising
    stacking spunbonded nonwoven fabric layers (B) on both sides of a meltblown nonwoven fabric layer (A),
    partially thermocompression bonding the layers with each other to produce a dense layer,
    stacking a reinforcing layer on at least one side of the dense layer,
    entangling the dense and reinforcing layers by needle punching to produce a multilayer nonwoven fabric for foam molding, and
    forming a foamed urethane on a side of the multilayer nonwoven fabric having a reinforcing layer by molding urethane foam onto the multilayer nonwoven fabric.

2. The process for producing the reinforced foam article according to claim 1, wherein the meltblown nonwoven fabric layer (A) which constitutes the dense layer has a fiber diameter in the range of 0.1 to 5 µm.

3. The process for producing the reinforced foam article according to claim 1, wherein the meltblown nonwoven fabric layer (A) which constitutes the dense layer has a basis weight in the range of 0.1 to 5 g/m².

4. The process for producing the reinforced foam article according to claim 1, wherein the spunbonded nonwoven fabric layers (B) which constitute the dense layer have a fiber diameter in the range of 10 to 20 µm.

5. The process for producing the reinforced foam article according to claim 1, wherein the spunbonded nonwoven fabric layers (B) which constitute the dense layer have a basis weight in the range of 10 to 20 g/m².

6. The process far producing the reinforced foam article according to claim 1, wherein the dense layer has a bulk density in the range of 0.05 to 0.5 g/cm³.

7. The process for producing the reinforced foam article according to claim 1, wherein the basis weight of the dense layer is in the range of 10 to 60 g/cm².

8. The process for producing the reinforced foam article according to claim 1, wherein the reinforcing layer is a spunbonded nonwoven fabric layer (C) having a fiber diameter of 12 to 50 µm and a basis weight of 10 to 50 g/m².

9. The process for producing the reinforced foam article according to claim 1, wherein the multilayer nonwoven fabric for foam molding has an air permeability of 25 to 160 (cm³/cm²/sec).

10. The process for producing the reinforced form article according to claim 1, wherein the multilayer nonwoven fabric for foam, molding has a basis weight of 20 to 160 g/m².

11. The process for producing the reinforced foam article according to claim 1, wherein the meltblown nonwoven fabric layer (A) and the spunbonded nonwoven fabric layers (B) are each formed of a propylene polymer.

12. The process for producing the reinforced foam article according to claim 1, wherein forming the foamed urethane is performed by placing the multilayer nonwoven fabric for foam molding in a mold, contacting the multilayer nonwoven fabric with a foaming urethane liquid thereby impregnating the reinforcing layer with the foaming urethane liquid, and foaming the urethane liquid.

* * * * *